United States Patent
Lee et al.

(10) Patent No.: US 7,106,199 B2
(45) Date of Patent: Sep. 12, 2006

(54) RF-ID SYSTEM WITH SENSOR AND METHOD OF SENDING ADDITIONAL SIGNALS

(75) Inventors: Dong-hyun Lee, Suwon-si (KR); Ja-nam Ku, Suwon-si (KR); Jong-hwa Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 10/851,230

(22) Filed: May 24, 2004

(65) Prior Publication Data

US 2005/0007250 A1 Jan. 13, 2005

(30) Foreign Application Priority Data

Jul. 8, 2003 (KR) ...................... 10-2003-0046143

(51) Int. Cl.
G08B 13/14 (2006.01)
(52) U.S. Cl. .................. 340/572.3; 340/572.1; 235/492
(58) Field of Classification Search ............. 340/572.3, 340/572.1, 572.6, 572.7; 235/492
See application file for complete search history.

(56) References Cited

U.S. PATENT DOCUMENTS

| 5,736,929 | A | * | 4/1998 | Schrott et al. ........... 340/572.1 |
| 5,973,600 | A | * | 10/1999 | Mosher, Jr. ............... 340/572.8 |
| 6,040,773 | A | * | 3/2000 | Vega et al. .............. 340/572.1 |
| 6,232,870 | B1 | * | 5/2001 | Garber et al. ............. 340/10.1 |
| 6,255,959 | B1 | | 7/2001 | Lake et al. |
| 6,294,953 | B1 | * | 9/2001 | Steeves ...................... 329/341 |
| 6,297,734 | B1 | | 10/2001 | Richardson et al. |
| 6,712,276 | B1 | * | 3/2004 | Abali et al. ................. 235/492 |
| 6,720,866 | B1 | | 4/2004 | Sorrells et al. |
| 2002/0021216 | A1 | | 2/2002 | Vossiek et al. |

FOREIGN PATENT DOCUMENTS

| GB | 2 308 947 | 7/1997 |
| JP | 2002-540699 | 11/2002 |
| WO | WO 00/45331 | 8/2000 |

* cited by examiner

Primary Examiner—John Tweel, Jr.
(74) Attorney, Agent, or Firm—Lee & Morse, P.C.

(57) ABSTRACT

In a radio frequency identification (RF-ID) system and method of sending additional signals, the radio frequency identification (RF-ID) system includes a tag portion including a sensor, the tag portion for outputting a composite signal including additional data from the sensor and basic data necessary for certification, an antenna for receiving the composite signal output from the tag portion, and a RF-ID reader portion for retrieving the composite signal received from the antenna and for decoding the basic data and the additional data.

23 Claims, 6 Drawing Sheets

(A)

(B)

(A)

(B)

(C)

(A)

(B)

RF-ID SYSTEM WITH SENSOR AND METHOD OF SENDING ADDITIONAL SIGNALS

BACKGROUND OF THE INVENTION

1. Field of the Invention

The present invention generally relates to a radio frequency identification (RF-ID) system and method capable of confirming data detected by a sensor in addition to basic data necessary for certification.

2. Description of the Related Art

With the development of radio technologies as a substitute for existing bar-code technology, a variety of RF-ID systems have been proposed. The systems have been used in a variety of manners, e.g., prepayment of a bus fare or a parking permit and permitting access to a restricted area, such as a laboratory. The basic configuration of these RF-ID systems includes a tag, having an integrated circuit (IC) and an antenna, and a reader. The antenna of the tag outputs information from the IC about the tagged object in the form of the radio frequency signal and the reader receives and confirms the information.

RF-ID systems are classified primarily as an active type or a passive type, depending on how power is supplied to the IC installed in the tag. In the active type system, power is supplied to the IC from a battery included in the tag. In the passive type system, power is supplied to the IC by an inductive current in response to a magnetic wave transmitted from the reader. The passive type system allows a thin, lightweight card to be used as the tag. The tag for the passive type system includes a coil, which induces current via a received magnetic wave and which serves as the antenna transmitting data output from the IC.

FIG. 1A is schematic diagram of a structure of a general passive type RF-ID system. As shown therein, the system includes a tag 10 having a coil 30 and an IC 20, an external antenna 40 and a reader 50. FIG. 1B is block diagram explaining the operation of the RF-ID system.

With reference to FIGS. 1A and 1B, when the card reader 50 approaches the tag 10, the coil 30 in the tag 10 receives a magnetic wave radiated by the external antenna 40 (S110). The coil 30 generates an inductive current from the magnetic wave according to Faraday's law (S120).

When the voltage generated due to the inductive current drives the IC 20, the IC 20 accesses data stored in an internal memory (not shown) (S130). Such data may include the tag owner's name, member number, resident registration number, whether or not entrance and exit is acceptable, manufacturing date and manufacturer of the tagged product, or any other useful information. The coil 30 serves as an internal antenna for the tag 10 and outputs the data in radio frequency signal format (S140).

The RF-ID reader 50 receives the data through the external antenna 40 (S150) and demodulates the received data (S160). Thus, the tag information can be confirmed (S170).

In such an existing RF-ID or other identification system, it may be desirable to also transmit additional, real-time data. Such real-time data can be obtained by measuring the present status of the tagged object or an environment of the tagged object. For example, in the case of barcodes, which are currently most widely used with industrial products, only the basic information on manufacturing number and price of that product is output. However, when storing sensitive goods, such as wine, it is necessary to keep the goods under certain conditions, e.g., within a certain temperature range, in order to efficiently manage the goods.

In order to measure a present status, the certification system must include a sensor. In case of a RF-ID system, the tag should include a sensor in addition to the coil and the IC. The most logical approach would involve designing the IC to convert the information from the sensor into digital data, so that additional data is output along with the basic data. This can be implemented with recently developed SOC (System On Chip) technology.

However, in addition to requiring a new IC design, if the RF-ID system is implemented by adding the sensor in this manner, other practical problems arise. First, since an analog-to-digital (A/D) converter is required for converting the sensor information into digital data, the increased power consumption due to the A/D converter excludes use of the passive type tag. Second, using a more complicated IC will inevitably increase the cost per tag. This increased cost would prevent widespread use of such a system.

SUMMARY OF THE INVENTION

In order to overcome the above-describe problems, it is a feature of the present invention to provide a RF-ID system and method wherein analog data detected by a sensor is output by the tag in addition to basic data. It is another feature of the present invention to achieve output of such additional data while adding only minimal hardware to existing system. It is yet another feature of the present invention to provide such additional data using a frequency-shifted or amplitude-varied signal.

At least one of the above and other features of the present invention may be realized by providing a radio frequency identification (RF-ID) system, including a tag portion including a sensor, the tag portion outputting a composite signal including additional data from the sensor and basic data necessary for certification, an antenna receiving the composite signal output from the tag portion, and a RF-ID reader portion retrieving the composite signal received from the antenna and decoding the basic data and the additional data.

The tag portion may include a coil generating an inductive current in response to a magnetic wave from the antenna and serving as an internal antenna for the tag portion to output the composite signal, an integrated circuit driven by the inductive current and retrieving the basic data to be output as a radio frequency signal, the sensor being driven by the inductive current and measuring a present status of an object associated with the tag portion, and a sensor signal generator embedding the additional data measured by the sensor with the radio frequency signal output from the integrated circuit to form the composite signal. The tag portion may further include a constant voltage supplying circuit that converts the inductive current generated by the coil into a constant voltage to be supplied to the integrated circuit and the sensor. The tag portion may be a sticker, and the coil, the IC and the sensor may be mounted on an adhesive surface of the sticker.

The RF-ID system may include an input data detection unit for detecting input data in addition to the magnetic wave received from the RF-ID reader to control the integrated circuit to retrieve data in response to the input data, the tag portion and the RF-ID reader performing a two-way wireless certification.

The sensor signal generator may shift the carrier frequency of the basic data in accordance with the additional data from the sensor. The sensor signal generator may include a variable capacitor connected to the coil. The variable capacitor may be in parallel with the coil.

The sensor signal generator may vary the amplitude of the basic data carrier in accordance with the additional data from the sensor. The sensor signal generator may include a variable resistor connected to the coil. The variable resistor may be in parallel with the coil.

At least one of the above and other features of the present invention may be realized by providing a method for confirming measured information in a RF-ID system including a tag portion and RF-ID reader, including detecting measured data with a sensor in the tag portion, retrieving basic data stored in the tag portion, creating a composite signal including the basic data and the measured data, outputting the composite signal from the tag portion, receiving the composite signal in the RF-ID reader, and decoding the basic data and the measured data the RF-ID reader.

The method may further include outputting a magnetic wave from the RF-ID reader, inducing a current from the magnetic wave received by the tag portion, and driving the detecting and retrieving using the current. The current may be converted into a constant voltage before use.

The creating of the composite signal may include frequency-shifting a carrier frequency varying an amplitude of a carrier frequency signal carrying the basic data. The decoding may include receiving a composite signal of the basic data and the measured data, demodulating the basic data, detecting the measured data, and confirming the basic data and the measured data. The detecting of the measured data may include detecting at least one of a frequency shift and an amplitude variation in a carrier frequency carrying the basic data.

At least one of the above and other features of the present invention may be realized by providing a tag portion for use in a RF-ID system, including a coil which outputs a current upon receiving a magnetic wave and which serves as an antenna, an integrated circuit, driven by the coil, which retrieves basic data stored in a memory, a sensor, driven by the coil, which detects additional data corresponding to a present status of an object associated with the tag portion, and a composite signal output unit which provides a composite signal having both the basic data and the additional data to the coil to be transmitted.

The composite signal output unit may receive the basic data on a carrier frequency and alter the carrier frequency in accordance with the additional data. The alteration may include shifting a frequency of the carrier frequency and/or varying an amplitude of the carrier frequency.

BRIEF DESCRIPTION OF THE DRAWINGS

The above and other features and advantages of the present invention will become more apparent by describing in detail illustrative, non-limiting embodiments thereof with reference to the attached drawings, and wherein.

DETAILED DESCRIPTION OF THE INVENTION

Korean Patent Application No. 2003-46143, filed on Jul. 8, 2003, in the Korean Intellectual Property Office, and entitled "RF-ID SYSTEM WITH SENSOR AND METHOD OF SENDING ADDITIONAL SIGNALS," is incorporated herein by reference in its entirety.

The present invention will now be described more fully hereinafter with reference to the accompanying drawings, in which illustrative embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art.

Figure 1A:
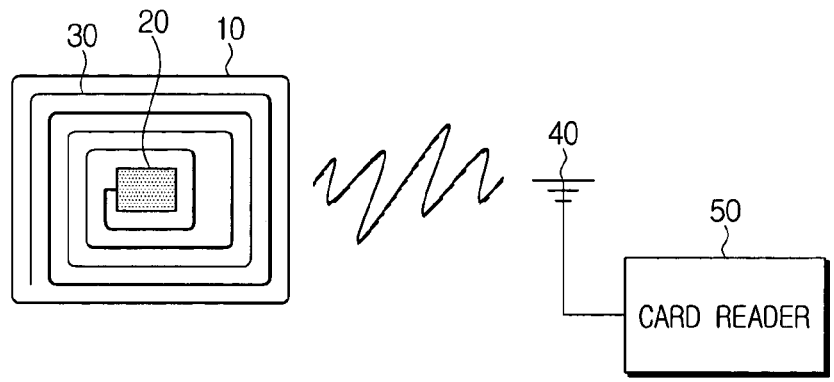
FIG. 1A is a schematic diagram of the configuration of a conventional RF-ID system.
Figure 1B:
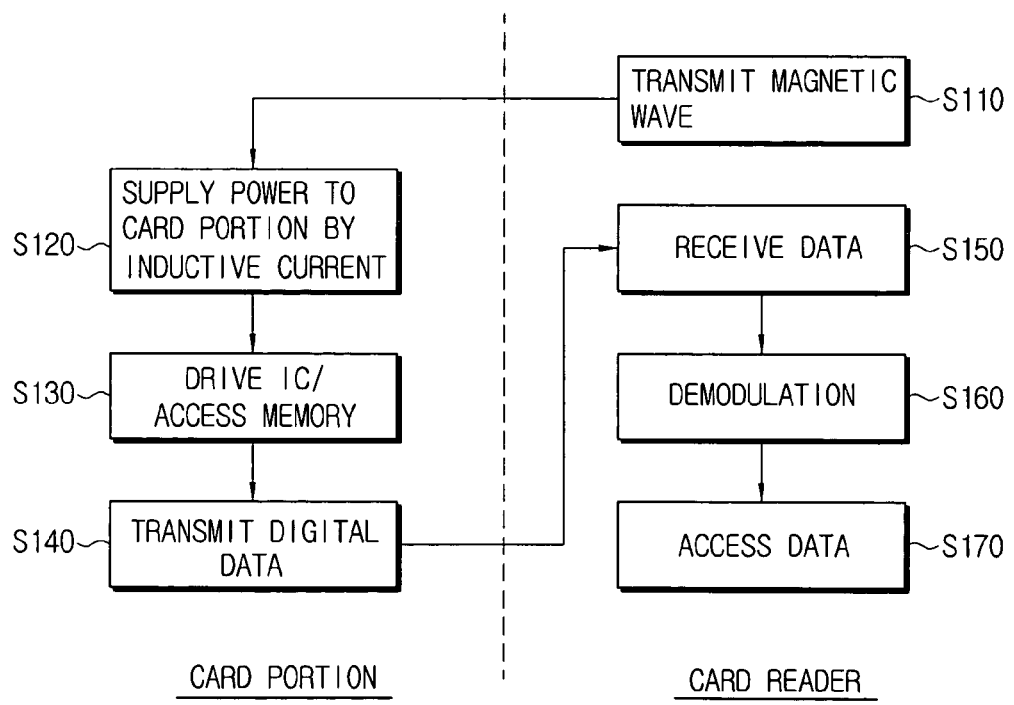
FIG. 1B is a block diagram explaining the operation of a conventional RF-ID system.
Figure 2:
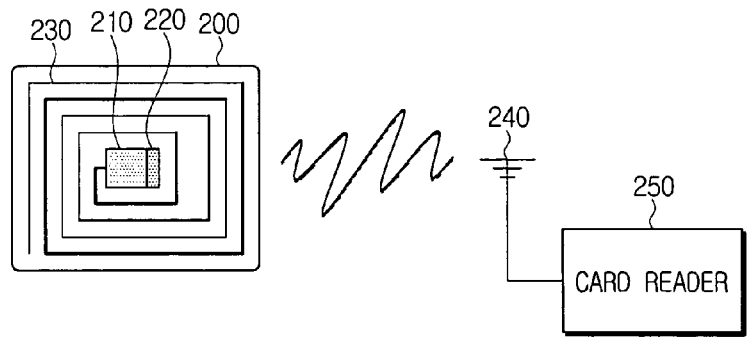
FIG. 2 is a schematic diagram of a configuration of a RF-ID system having a sensor device according to the present invention.

FIG. 2 is a schematic diagram of a configuration of a RF-ID system having a sensor according to the present invention. The RF-ID system shown in FIG. 2 includes a tag portion 200 having a coil 230, an IC 210 and a sensor 220. An antenna 240, external to the tag portion 200, receives a radio frequency output from the tag portion 200. A RF-ID reader 250 processes the basic data and additional data received from the antenna 240.

Figure 3:
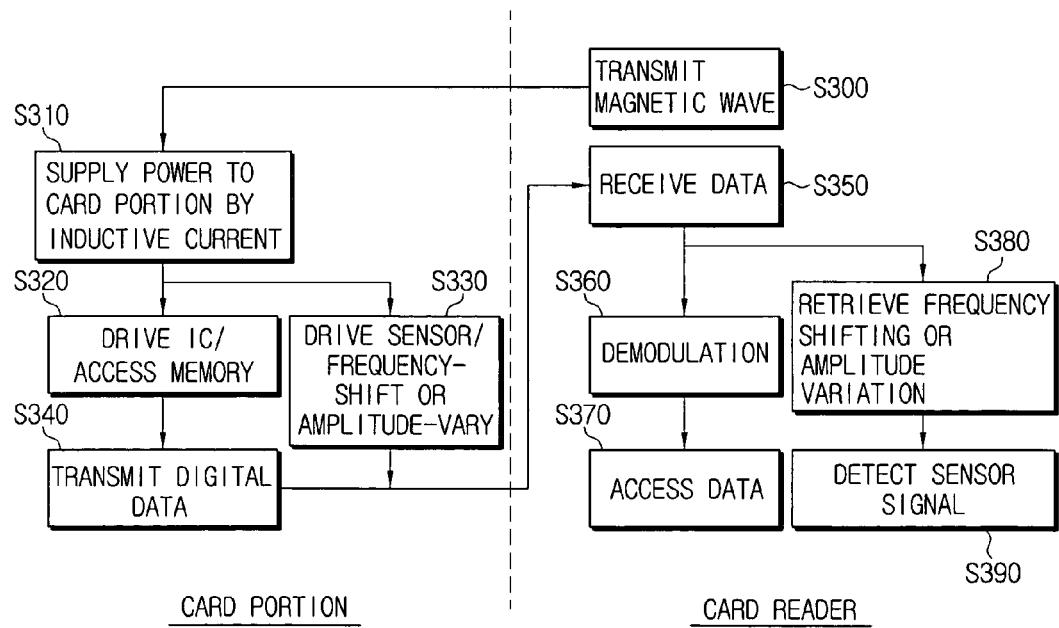
FIG. 3 is a block diagram explaining an operation of the RF-ID system according to the present invention.

FIG. 3 is a block diagram explaining an operation of the RF-ID system according to the present invention. A left side of the dashed line indicates an operation of the tag portion 200, and a right side thereof indicates an operation of the RF-ID reader 250.

In order to perform the certification, when the RF-ID reader 250 approaches the tag portion 200, a magnetic wave emitted from the RF-ID reader 250 is transmitted to the tag portion 200 (S300). When the tag portion 200 receives the magnetic wave, the inductive current induced according to Faraday's law flows through the coil 230, thereby supplying the tag portion with power (S310). The supplied power allows the IC 210 in the tag portion 200 to access basic data stored in an internal memory (S320). The supplied power also allows the sensor 220 to add data measured thereby to the basic data (S330). The construction of the sensor 220 is determined depending on a kind of information to be measured. For example, a sensor measuring temperature, humidity, impact, illumination, or any desired characteristic, can be used.

The additional data and basic data are transmitted through the coil 220 in the tag portion 200 (S340). The basic data is transmitted on a carrier frequency of digital data format. The additional data from the sensor is transmitted in an analog data format without separate conversion into digital data. This analog format may be embedded with the basic data by frequency-shifting or amplitude-varying the carrier frequency to form a composite signal.

When the composite signal having the additional data and basic data is transmitted by the tag portion 200, the RF-ID reader 250 receives the additional data and basic data through the antenna 240 (S350). Since the basic data carrying basic information necessary for certification is in digital format, the basic data is confirmed by the RF-ID reader 250 through a demodulation process (S360, S370). Since the additional data is in analog format, the RF-ID reader 250 may retrieve this data by detecting a frequency shift or an amplitude variation in the carrier frequency (S380, S390).

Figure 4:
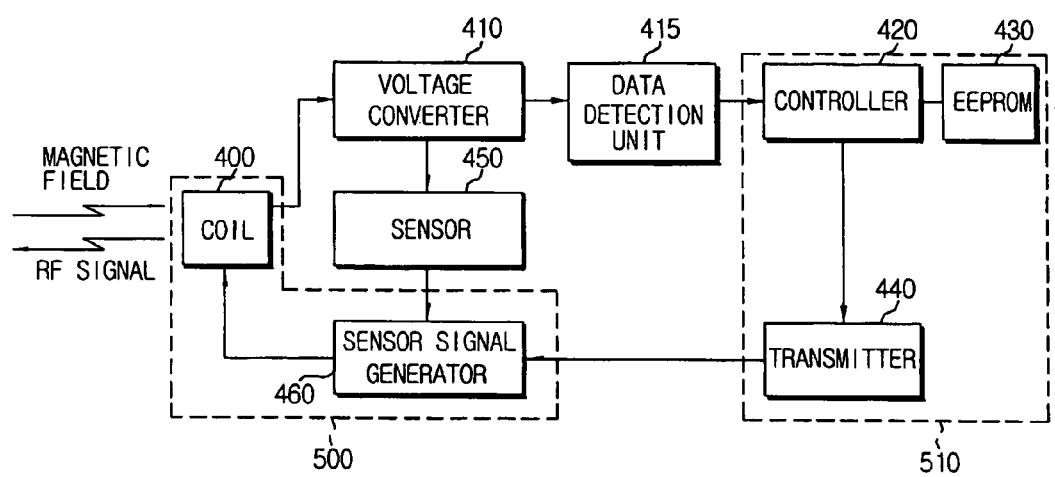
FIG. 4 is a block diagram of a tag portion of the RF-ID system according to the present invention.

FIG. 4 is a block diagram of a configuration of a tag portion 200 of the RF-ID system according to the present invention. The tag portion includes a signal output unit 500, an IC 510, a voltage converter 410 and a sensor 450. The signal output unit 500 includes a coil 400 and a sensor signal generator 460. While the present embodiment illustrates the IC 510 as including a controller 420, an electrically erasable read-only memory (EEPROM) 430, and a transmitter 440, this is only for illustrative purpose, not for limiting the present embodiment.

The coil 400 acts as an inductive current generator receiving an external magnetic field and serves as an antenna outputting radio frequency signal from the tag portion. When the coil 400 generates the inductive current, the voltage-converter 410 converts the inductive current into a constant voltage. Since inductive current is induced depending on the variation of the magnetic field intensity, it is unstable. Thus, it is necessary to convert the inductive current into the constant voltage to drive the IC 510 and the sensor 450. The voltage converted by the voltage-converter 410 is supplied to the IC 510 and the sensor 450.

When the above-described embodiment is implemented with a one-way RF-ID system (e.g., in a prepayment system, such as for a bus fare), the RF-ID reader outputs only a simple magnetic wave to drive the tag portion. A two-way RF-ID system having a more complicated structure may be used where the RF-ID reader outputs data in addition to the magnetic wave. This data is then extracted in the tag portion. For example, the data may be extracted by including an optional data detection unit 415 between the voltage-converter 410 and the IC 510. The extracted data is input to the controller 420, the controller 420 can retrieve desired information from EEPROM 430 according to the input data, thereby allowing exchange of information between the RF-ID reader 250 and the tag portion 200.

When the controller 420 within the IC 510 is supplied with the constant voltage, the basic data stored on EEPROM 430 is retrieved and output to the transmitter 440. The transmitter 440 outputs the basic data carried on the carrier frequency in digital data format.

At the same time, the voltage from the voltage-converter 410 is supplied to the sensor 450, which detects a desired characteristic and inputs the detected signal to a sensor signal generator 460 in analog data format. The sensor 450 may be realized using a simple circuit configuration. The sensor signal generator 460 shifts the carrier frequency and/or varies the amplitude of the carrier frequency output from the transmitter 440, thereby outputting additional data detected by the sensor in analog format.

Figure 5:
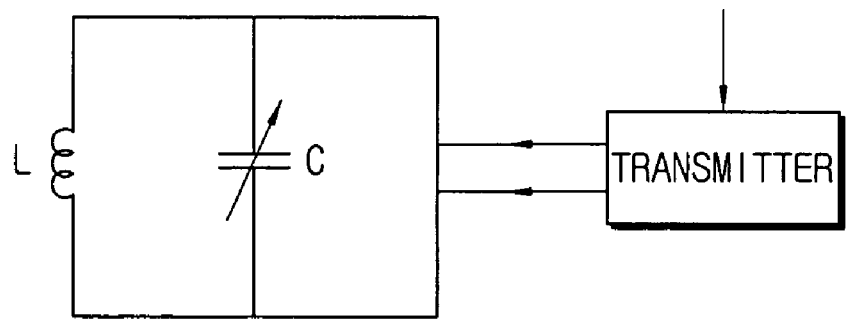
FIGS. 5A and 5B are schematic circuit diagrams of embodiments of the signal output unit used in the tag portion of the present RF-ID system.
Figure 5:
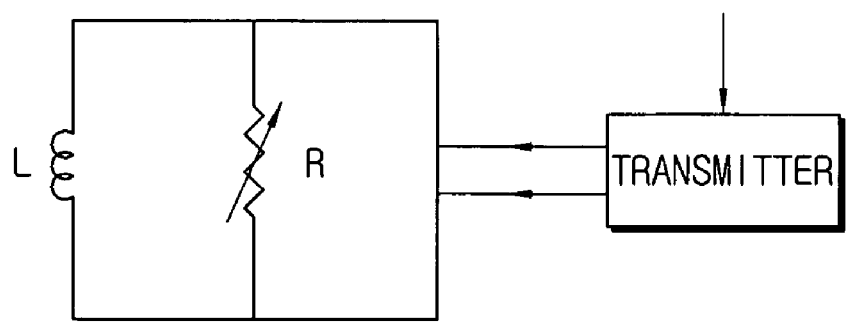

Configurations of the signal output unit 500 are shown in FIGS. 5A and 5B. Both of these configurations use the coil 400, which is also used as the antenna in the tag portion 200. While the following configurations use specific variable elements in parallel with the coil, other variable elements may be employed and/or the variable element may be provided in series with the coil.

FIG. 5A is a schematic illustration of the signal output unit 500 including the coil 400 indicated by an inductance L of the coil 400 in parallel with a variable capacitor indicated by a capacitance C of the variable capacitor. The capacitance C of the capacitor varies depending on the value measured by the sensor 450, causing the carrier frequency to be shifted.

FIG. 5B is a schematic illustration of the signal output unit 500 including the coil 400 indicated by an inductance L of the coil 400 in parallel with a variable resistor indicated by a resistance R of the variable resistor. The resistance R of the resistor varies depending on the value measured by the sensor 450, causing the amplitude of the carrier frequency to be varied.

The RF-ID reader 250 extracts the basic data carried on the carrier frequency through the demodulation process and also detects the additional data by measuring the shifted frequency or the varied amplitude.

Figure 6:
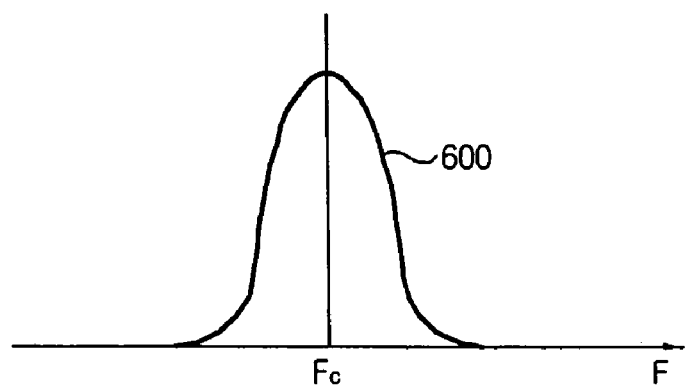
FIGS. 6A through 6C are plots of basic data and additional data detected by RF-ID reader according to embodiments of the present invention.
Figure 6:
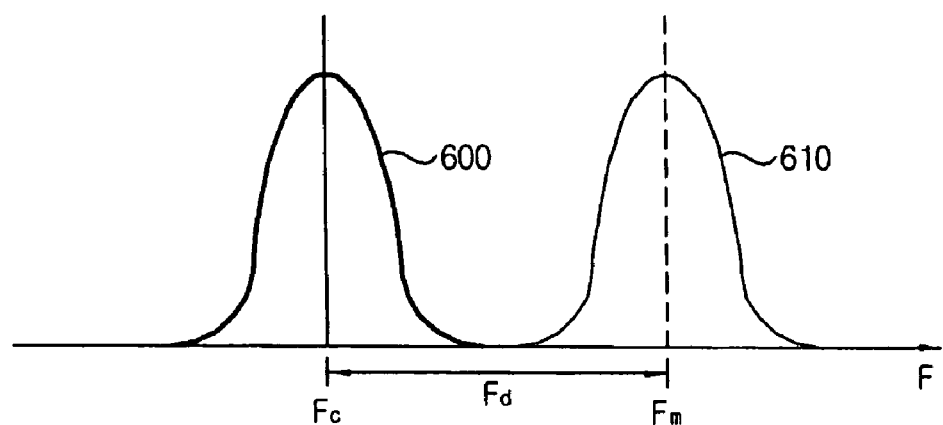
Figure 6:
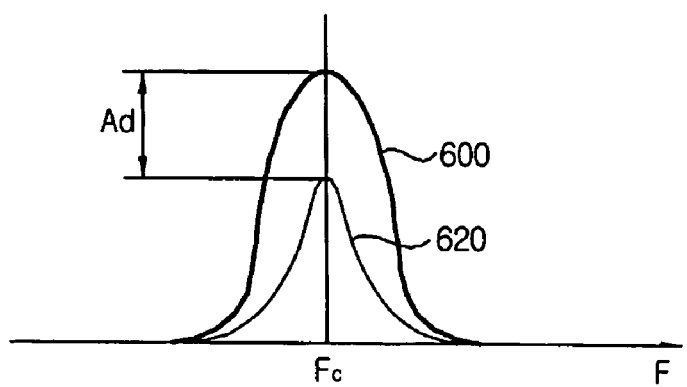

FIGS. 6A–6C are graphs of basic data and additional data detected by a RF-ID reader according to an embodiment of the present invention. FIG. 6A shows a carrier frequency ($F_c$) signal 600 for the basic data. FIG. 6B shows additional data represented by shifting the carrier frequency signal 600 by a certain amount ($F_d$) to provide a shifted signal 610 at a frequency ($F_m$) when the signal output unit 500 uses the variable capacitor, as shown in FIG. 5A. When the carrier frequency ($F_c$) of the basic data is shifted by the certain amount ($F_d$), the RF-ID reader measures the frequency ($F_m$) of the shifted signal 610 and detects the capacitance of the variable capacitor according to the formula $|F_c-F_d|=F_m$, resulting in the additional data being detected.

FIG. 6C shows additional data represented by varying the amplitude of the carrier frequency signal 600 by an amount $A_d$ to provide a varied signal 620 when the signal output unit 500 uses the variable resistor as shown in FIG. 5B. The RF-ID reader detects the additional data by measuring the variation of the amplitude $A_d$ of the varied signal 620 and detects the resistance of the variable resistor. Additionally, both the amplitude may be varied and the frequency may be shifted to embed more than one measured value.

Figure 7:
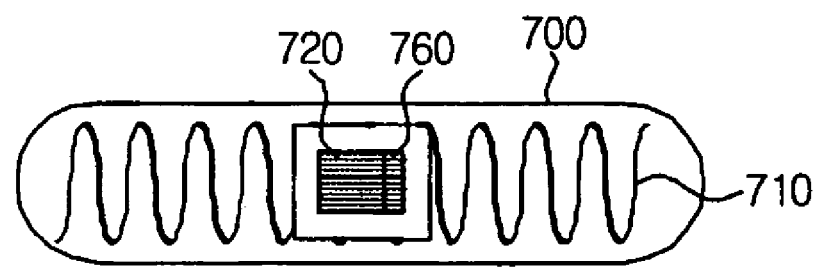
FIGS. 7A–7B are schematic diagrams of different configurations of the tags of the present RF-ID system.
Figure 7:
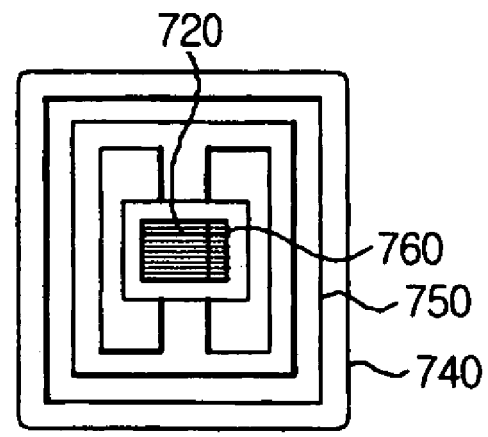

The RF-ID system with the sensor according to the present invention may be used in a wide variety of applications. FIGS. 7A and 7B show further embodiments of the tag portion for the present RF-ID system. FIGS. 7A and 7B show tags as an adhesive tape or a sticker, respectively. These tags allow easy removal thereof, as opposed to the card form in a general wireless certification system noted above.

Referring to FIGS. 7A and 7B, coils 710 and 750 are mounted on the tag of an adhesive tape 700 or a sticker 740, respectively. These tags also include an IC 720 and a sensor 760 driven by current induced by their respective coils. The IC 720 and the sensor 760 are driven in a manner that the signal detected by the sensor embedded in the basic data signal by frequency-shifting and/or amplitude-varying the carrier frequency signal output from the transmitter within the IC, as described above.

Thus, it is possible to measure a present status of a tagged object in addition to the basic data necessary for certification. By outputting the data in analog form, there is no need to develop a new IC, thereby reducing the cost per unit of the tag portion. Therefore, it is possible to produce a disposable tag for regular use in daily life. The tag portion may be in the form of a sticker or an adhesive tape, allowing simple, disposable use. For example, when a sticker tag is attached to a patient having a condition requiring a status check of a characteristic, such as temperature, any time the RF-ID reader approaches the tag portion, this status information data may be gathered in addition to the basic data such as name, age, and gender of the patient.

Embodiments of the present invention have been disclosed herein and, although specific terms are employed, they are used and are to be interpreted in a generic and descriptive sense only and not for purpose of limitation.

Accordingly, it will be understood by those of ordinary skill in the art that various changes in form and details may be made without departing from the spirit and scope of the present invention as set forth in the following claims.

What is claimed is:

1. A radio frequency identification (RF-ID) system, comprising:
    a tag portion including a sensor, the tag portion for outputting a composite signal including additional data from the sensor and basic data necessary for certification, the additional data being output in analog format;
    an antenna for receiving the composite signal output from the tag portion; and
    a RF-ID reader portion for retrieving the composite signal received from the antenna and for decoding the basic data and the additional data.

2. The RF-ID system as claimed in claim 1, wherein the tag portion comprises:
    a coil for generating an inductive current in response to a magnetic wave from the antenna and for serving as an internal antenna for the tag portion to output the composite signal;
    an integrated circuit driven by the inductive current for retrieving the basic data to be output as a radio frequency signal;
    the sensor being driven by the inductive current for measuring a present status of an object associated with the tag portion; and
    a sensor signal generator for embedding the additional data measured by the sensor with the radio frequency signal output from the integrated circuit to form the composite signal.

3. The RF-ID system as claimed in 2, wherein the tag portion further comprises a constant voltage supplying circuit that converts the inductive current generated by the coil into a constant voltage to be supplied to the integrated circuit and the sensor.

4. The RF-ID system as claimed in 2, further comprising an input data detection unit for detecting input data in addition to the magnetic wave received from the RF-ID reader to control the integrated circuit to retrieve data in response to the input data, the tag portion and the RF-ID reader performing a two-way wireless certification.

5. The RF-ID system as claimed in claim 2, wherein the sensor signal generator shifts the carrier frequency of the basic data in accordance with the additional data from the sensor.

6. The RF-ID system as claimed in claim 5, wherein the sensor signal generator includes a variable capacitor connected to the coil.

7. The RF-ID system as claimed in claim 6, wherein the variable capacitor is in parallel with the coil.

8. The RF-ID system as claimed in claim 2, wherein the sensor signal generator varies the amplitude of the basic data carrier in accordance with the additional data from the sensor.

9. The RF-ID system as claimed in claim 8, wherein the sensor signal generator includes a variable resistor connected to the coil.

10. The RF-ID system as claimed in claim 8, wherein the variable resistor is in parallel with the coil.

11. The RF-ID system as claimed in claim 2, wherein the tag portion is a sticker, and the coil, the integrated circuit and the sensor are mounted on an adhesive surface of the sticker.

12. A method for confirming measured information in a radio frequency identification (RF-ID) system including a tag portion and a RF-ID reader, comprising:
    detecting measured data with a sensor in the tag portion;
    retrieving basic data stored in the tag portion;
    creating a composite signal including the basic data and the measured data;
    outputting the composite signal from the tag portion, the measured data of the composite signal being output in analog format;
    receiving the composite signal in the RF-ID reader; and
    decoding the basic data and the measured data the RF-ID reader.

13. The method as claimed in claim 12, further comprising:
    outputting a magnetic wave from the RF-ID reader;
    inducing a current from the magnetic wave received by the tag portion; and
    driving the detecting and retrieving using the current.

14. The method as claimed in claim 13, further comprising converting the current into a constant voltage before the driving.

15. The method as claimed in claim 12, wherein decoding the basic data and the measured data comprises:
    receiving a composite signal of the basic data and the measured data;
    demodulating the basic data;
    detecting the measured data; and
    confirming the basic data and the measured data.

16. The method as claimed in claim 15, wherein detecting the measured data comprises detecting at least one of a frequency shift and an amplitude variation in a carrier frequency carrying the basic data.

17. A tag portion for use in a radio frequency identification (RF-ID) system, comprising:
    a coil for outputting a current upon receiving a magnetic wave and for serving as an antenna;
    an integrated circuit, driven by the coil, for retrieving basic data stored in a memory;
    a sensor, driven by the coil, for detecting additional data corresponding to a present status of an object associated with the tag portion; and
    a composite signal output unit for providing a composite signal having both the basic data and the additional data to the coil to be transmitted, the additional data being transmitted in analog format.

18. The tag portion as claimed in claim 17, wherein the composite signal output unit receives the basic data on a carrier frequency and alters the carrier frequency in accordance with the additional data.

19. The tag portion as claimed in claim 18, wherein the composite signal output unit alters the carrier frequency by at least one of shifting a frequency of the carrier frequency and varying an amplitude of the carrier frequency.

20. The RF-ID system as claimed in 1, wherein the composite signal includes the basic data on a carrier frequency altered in accordance with the additional data.

21. The method as claimed in claim 12, wherein creating the composite signal includes providing the basic data on a carrier frequency and altering the carrier frequency in accordance with the additional data.

22. The method as claimed in claim 21, wherein altering the carrier frequency comprises frequency-shifting the carrier frequency.

23. The method as claimed in claim 21, wherein altering the carrier frequency comprises varying an amplitude of the carrier frequency.

* * * * *